Figure 1:
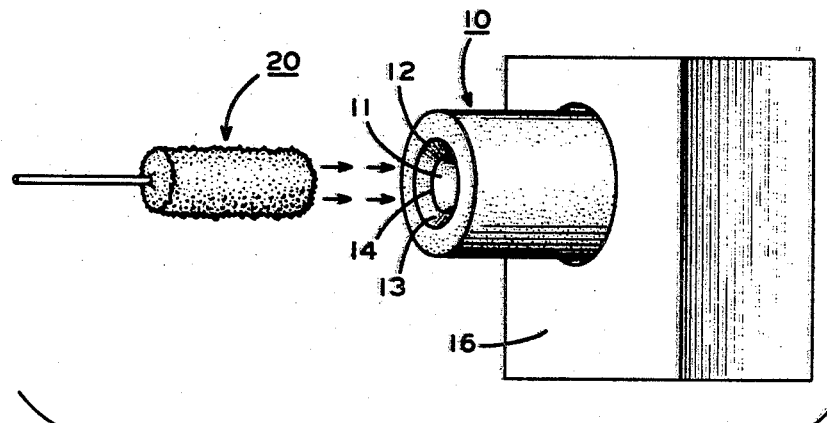

INVENTOR.
LAWRENCE E. FOURNIER
BY *Connolly and Hutz*
HIS ATTORNEYS

United States Patent Office 3,111,428
Patented Nov. 19, 1963

3,111,428
PREPARATION OF ANODE BODIES
Lawrence E. Fournier, Penacook, N.H., assignor to Sprague Electric Company, North Adams, Mass., a corporation of Massachusetts
Filed Jan. 16, 1961, Ser. No. 83,101
3 Claims. (Cl. 117—200)

This invention relates to anodes for solid electrolyte capacitors and more particularly to the preparation of solid electrolyte capacitor anodes of uniform profile.

Solid electrolyte capacitors comprise a sintered anode pellet formed with a dielectric oxide on the surfaces of the particles of the pellet and have a dry solid electrolyte positioned in and around the pores of the pellet. These anodes are incorporated in a suitable casing after the application of the cathode or counterelectrode to the solid electrolyte. This assembly of the completed capacitor into its final form places requirements upon the capacitor unit in order to insure the uniformity of the finished product both in size and performance.

The dry solid electrolyte is produced in connection with the anode body by an impregnation and coating of the anode body with a decomposable manganous salt from a solution of the salt such as manganous nitrate. The manganous nitrate is pyrolytically decomposed to manganese dioxide in situ on the pellet.

After the production of the manganese dioxide in repeated applications, the resultant unit with the dry solid electrolyte in place must be fitted into a suitable casing to produce a useful capacitor. The production of the manganese dioxide on the pellet results in an outer layer of indeterminate dimension having a plurality of extending rough areas or burrs, and which may vary from unit to unit in successive production of a number of units.

To achieve a satisfactory product, it is necessary to create a body formed with the dielectric oxide and having dry electrolyte of uniform proportions and characteristics in successive units. In intermediate body of varying characteristics is of little practical value in the useful production of a finished capacitor. Accordingly, it is necessary to have some means of uniformly producing the intermediate product.

It is an object of this invention to provide uniform solid electrolyte capacitors utilizing sintered pellets as anodes with a dielectric film and with a solid electrolyte of manganese dioxide in contact with the dielectric film throughout the pellet.

It is still another object of this invention to provide a process for the production of an intermediate body for a dry electrolyte tantalum capacitor having a uniform outer layer of dry solid electrolyte.

It is still a further object of this invention to provide a process for the production of a dry electrolyte capacitor by the decomposition of a manganous salt to produce manganese dioxide in which the manganese dioxide outer layer is formed into a uniform layer without effect upon the other elements of the unit.

Figure 2:
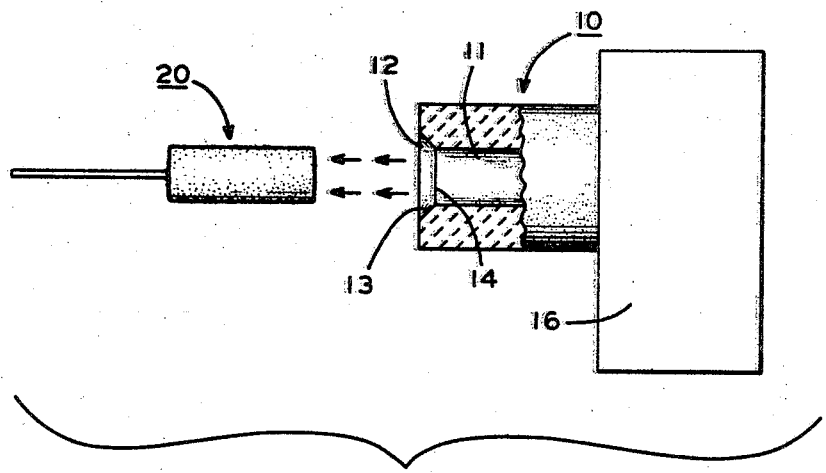

These and other objects of this invention will become more apparent upon consideration of the following description taken together with the accompanying drawing in which:

FIGURE 1 is a perspective view of an anode about to be processed according to this invention; and FIGURE 2 is an elevational view in partial section of the uniform product of this invention.

In general this invention involves controlling the extent of the outer layer of manganese dioxide formed on an anode pellet by the decomposition of a manganous salt in the production of a solid electrolyte tantalum capacitor.

In carrying out the process of this invention, an anode is produced by sintering tantalum particles to form a porous anode pellet. The porous anode pellet is subjected to anodization by the electrolysis of an electrolyte solution in which the pellet is immersed. Following the formation of a suitable dielectric film on the tantalum pellet, as indicated by stable leakage current through the dielectric film, the pellet is subjected to the application of a solid electrolyte.

The solid electrolyte is prepared by disposing within and substantially filling the pores of the tantalum pellet with a manganous salt. After impregnation of the pellet, the manganous salt is pyrolytically decomposed to manganese dioxide by firing at temperature and time sufficient to drive off all visible signs of $NO_2$. The temperatures of firing range up to but not in excess of 450° C. The oxide coating on the tantalum pellet is reformed after production of the manganese dioxide. This reformation is carried on to the point where the leakage current drops off as the result of the repair of any breaks in the dielectric oxide film. The steps of reformation and reimpregnation and firing to produce the manganese dioxide are repeated until all the pores of the pellet are filled and the surface is entirely coated with the manganese dioxide on the dielectric film of the tantalum pellet.

When the manganese dioxide is of sufficient thickness to establish the function of the capacitor, further cycling of impregnation and formation is discontinued and the semi-finished unit is prepared for final assembly. In the preparation of the semi-finished unit the rough exterior of manganese dioxide is worked to produce a satisfactory unit for assembly in a casing.

It will be understood that this invention relates to small units that are relatively fragile during production. The adaptation of the rough coat of manganese dioxide on the tantalum pellet must employ means that will not injure or impair in any way the electrical characteristics of the final product. At the same time the manganese dioxide must be brought into specific size tolerances with a minimum of steps so as to provide a simple procedure for the production of the solid electrolyte capacitor.

The uniform outer layer of solid electrolyte is produced in a desired thickness by working the semi-finished body in a grinding cavity. The grinding tool as illustrated in the drawing is composed of a block 10 of an abrasive material which is inserted in a reciprocating vibrator 16. Abrasive block 10 has a cavity 11 which receives the semi-finished body 20. A funnel section 12 has sloping walls 13 which lead to the uniform bore cavity 11. The cavity 11 has a diameter selected to produce a specified desired thickness of the outer layer on the finished anode body. The walls 13 are sloped at an angle of approximately 45° to form a shoulder 14 at the junction with cavity 11. The abrasive material of shoulder 14 acts upon the jagged rough outer coating of manganese dioxide as the semi-finished body is introduced into the cavity 11. A reciprocatory motion brings the abrasive material and the semi-finished body together and causes the abrasive material to act upon the rough coat of manganese dioxide and fashion it to the desired thickness established by the bore of cavity 11. The action of the shoulder 14 on the rough coat of manganese dioxide plays an important part in producing the desired thickness of manganese dioxide layer.

The cavity 11 has an inner diameter of not substantially greater dimension than the desired outer dimension of the semi-finished unit. It has been found that the essentially back and forth reciprocatory type of action produced by a commercial dental vibrator provides a controlled removal of the excess of the outer coat without damaging the electrical characteristics of the resultant unit.

After the controlled reciprocatory abrading or grinding of the semi-finished product and the resulting reduction of the outside manganese dioxide layer to a usefully uniform thin layer, the capacitor is completed by the application of a cathode electrode and finally the assembly of the capacitance section in a suitable housing for use; both according to now conventional practice in the solid electrolyte capacitor art.

The back and forth reciprocatory motion between the abrasive stone and anode body with a minimum or side to side movement together with the fine grit composition of the stone are important in producing the control of the finished coating. The semi-finished body 20 moves axially into funnel 12 as reciprocation causes the stone 10 to come into contact with rough coat of manganese dioxide. The abrasive material acts upon the coat to cause a reduction in the surface irregularities until the relatively smooth body of FIGURE 2 is obtained. While stone 10 is sufficiently abrasive to cause removal of the manganese dioxide, it does so without damage to the electrical characteristics of the material in the anode body.

It will be understood that while this invention is described as applicable to solid electrolyte capacitors made up of tantalum pellets and manganese dioxide solid electrolyte as the components of the capacitor, this invention is equally applicable to other semiconductive materials applied to the film-formed anode pellet by suitable means.

What is claimed is:

1. A process of producing a uniform solid electrolyte on a sintered tantalum pellet for combination in a solid electrolyte capacitor which comprises impregnating a film-formed porous body of sintered tantalum particles to penetrate the pores of the body with a solution of a salt, thermally decomposing the salt to form an oxide, repeating the impregnation and decomposition a multiplicity of times to substantially completely fill the interstices between the particles and form a layer of oxide of indeterminate thickness around said body, and abrading the outer surface of the layer by a reciprocatory motion against an annular surface of uniform diameter and an annular surface of a varying diameter in a cavity formed in an abrasive material.

2. A process for controlling the extent of a layer of solid electrolyte on an impregnated sintered tantalum pellet for combination in a solid electrolyte capacitor which comprises impregnating a film-formed porous body of sintered tantalum particles to penetrate the pores of the body with a solution of a salt, thermally decomposing the salt to form an oxide, repeating the impregnation and decomposition a multiplicity of times to substantially completely fill the interstices between the particles and form a layer of oxide of indeterminate thickness around said body, and abrading the surface of the layer by a reciprocatory motion against an annular surface of uniform diameter and an annular surface of a varying diameter in a cavity formed in an abrasive material.

3. In a process for producing a predetermined layer of solid electrolyte on a sintered tantalum body, the steps of impregnating a film-formed porous body of sintered tantalum particles with a solution of thermally decomposable salt, thermally decomposing the salt to a solid electrolyte, repeating the impregnation and decomposition so as to produce a coat of solid electrolyte on the body, and abrading the body against the abrasive surfaces at the shoulder formed between an annular surface of varying diameter and an annular surface of uniform diameter in a cavity formed in an abrasive material so as to produce a desired uniformity of said solid electrolyte layer.

References Cited in the file of this patent

UNITED STATES PATENTS

| | | |
|---|---|---|
| 2,800,616 | Becker | July 23, 1957 |
| 2,933,437 | Loosme | Apr. 19, 1960 |
| 2,936,514 | Millard | May 17, 1960 |